| United States Patent [19] | [11] | 4,280,873 |
|---|---|---|
| Hahn | [45] | Jul. 28, 1981 |

[54] NUCLEAR POWER INSTALLATION WITH LOOP ARRANGEMENT

[75] Inventor: Günter Hahn, Bergisch Gladbach, Fed. Rep. of Germany

[73] Assignee: Interatom, International Atomreaktorbau GmbH, Bergisch Gladbach, Fed. Rep. of Germany

[21] Appl. No.: 20,724

[22] Filed: Mar. 15, 1979

[30] Foreign Application Priority Data

Mar. 20, 1978 [DE] Fed. Rep. of Germany ....... 2812124

[51] Int. Cl.³ ............................................ G21C 15/00
[52] U.S. Cl. ......................................... 176/65; 176/38
[58] Field of Search ........................ 176/40, 38, 65, 87

[56] References Cited

U.S. PATENT DOCUMENTS

| 3,242,981 | 3/1966 | Hutchinson et al. .................. 176/65 |
| 3,793,143 | 2/1974 | Muller ................................... 176/65 |
| 3,956,063 | 5/1976 | Johnson et al. ........................ 176/65 |

Primary Examiner—Harvey E. Behrend
Attorney, Agent, or Firm—Herbert L. Lerner

[57] ABSTRACT

Nuclear power installation with liquid metal cooling, including a reactor cavity, a primary circulatory loop carrying heat from the reactor cavity, a secondary coolant loop, an intermediate heat exchanger for transferring heat from the primary loop to the secondary loop and a pump coolant through the loops, the intermediate heat exchanger means and pump being disposed in separately insulated and heated component tanks, portions of the loops connected to the intermediate heat exchanger and pump forming lines leading into the reactor cavity in radial direction thereof and into the component tank in tangential direction thereof the connecting line being helically disposed within the component tanks, and the intermediate heat exchanger and/or the pump being disposed inside the helix.

6 Claims, 7 Drawing Figures

NUCLEAR POWER INSTALLATION WITH LOOP ARRANGEMENT

The present invention relates to a nuclear power plant with liquid-metal cooling, in which the heat produced is given off by the nuclear reactor to primary loops and by the latter in intermediate heat exchangers to secondary loops, where the nuclear reactor may be a so-called fast sodium-cooled reactor. Such a plant is presently under construction by the corporate assignee of the instant application in Kalkar. In that installation, the components of the primary loops are disposed outside the reactor tank but within the reactor cavity and are connected to the reactor tank itself by pipes. Enlarging such a plant, which is constructed for an output of 300 MW, to an output 2000 MW leads to construction difficulties due to the increased dimensions of the individual components, which can be circumvented by a change in the construction.

It is accordingly an object of the invention to overcome the hereinaforementioned shortcomings of the heretofore known devices of this general type and to provide a nuclear power plant installation with loop arrangement which meets, among other things, the following requirements, while basically retaining known components:

1. The plant should be as space-saving as possible.
2. The individual components of the primary loops should be disposed as close together as possible, so that the pipes connecting them are as short as possible.
3. In the event of a leak in the parts of the plant which carry liquid metal, the liquid metal should flow quickly to leakage collection points which are centrally disposed; in particular, the concrete of the containment of the plant should be protected against contact with the hot liquid metal in order to prevent the release of water from the concrete.
4. A clear separation of the radioactive parts of the plant from the rest of the parts should be ensured, especially in view of possible uncontrolled energy releases in the reactor itself.
5. The accessibility of the individual parts of the heat transfer system for repairs and tests during the construction of the plant, and later as well, is to be impeded as little as possible.

With the foregoing and other objects in view, there is provided, in accordance with the invention, a nuclear power installation with liquid metal cooling, including a reactor cavity, a primary circulatory loop carrying heat from the reactor cavity, a secondary coolant loop, intermediate heat exchanging means for transferring heat from the primary loop to the secondary loop and means for pumping coolant through the loops, the intermediate heat exchanging means and pumping means being disposed in separately insulated and heated component tanks, portions of the loops connected to the intermediate heat exchanging means and pumping means forming lines leading into the reactor cavity in radial direction thereof and into the component tank in tangential direction thereof, the connecting lines being helically disposed within the component tanks, and the intermediate heat exchanging means are disposed inside said helix. The tanks and pipe ducts (which will be discussed hereinafter) are equipped with the well-known heat insulation and radiation shields, so that insulation of the individual parts of the heat transmission system can be dispensed with. The component tanks and pipe ducts are therefore "hot" and they are exposed to a gas which is inert vis-a-vis the liquid metal, so that no reactions between the liquid metal and the atmosphere can come about if leaks occur. The insulation and shields can be removed entirely or partially in a well known manner, which provides the accessibility of the tanks and pipe ducts. Since practically the entire heat transmission system is disposed outside the reactor cavity, the dimensions of the latter can be kept smaller, and it can surround the reactor tank relatively closely. The component tanks, in turn, are of a size which is technically realizable. The capability of the disposition of several (e.g., four) identically equal primary loops symmetrically about the nuclear reactor facilitates the construction of the plant, inasmuch as prefabricated parts can be used therefor to a large extent.

In accordance with another feature of the invention, the intermediate heat exchanging means and pumping means associated with a primary loop are disposed in a common component tank.

In accordance with a further feature of the invention, the intermediate heat exchanging means and pumping means associated with a primary loop are disposed in separate component tanks. While involving greater structural expense, the embodiment (employing separate tanks) has the advantage of improved accessibility of every component if the tank is open, whereby the required work can be finished faster and the expensive shutdown time can be shortened. Which of the alternatives is more advantageous for a given installation can be decided only after weighing these considerations which must be balanced according to each individual case, and after an accurate analysis of the operation has been performed.

In accordance with an additional feature of the invention, there are provided pipe ducts connected from the reactor cavity to the component tanks, the connecting lines being disposed so as to pass through the pipe ducts. Furthermore, the pipe ducts and the pipes conducted in them may be elastic. Thus, the reactor tank, the component tanks and the components themselves can be anchored firmly, while the changes in length of the pipe lines, which occur due to temperature changes, are compensated due to their elastic resiliency.

Additionally, the elastic parts of the pipe lines may be located inside the component tank itself; they can be accommodated there without special difficulties.

Moreover, the pumps and/or the intermediate heat exchangers may be disposed in the neutron beam shadow of the reactor, whereby these important and possibly trouble-prone parts remain much more accessible for servicing and repair and, in particular, activation of the coolant in the secondary loop is prevented. For this reason the pipe lines run into the containment radially and into the component tanks tangentially. The neutron radiation which enters through the opening formed in the containment for bringing the piping through thus only strikes the curvature of the pipe line after it enters the component tank. Simultaneously, this construction facilitates the layout of the expansion loops specified above.

In accordance with an added feature of the invention, there are provided inspection openings formed in at least one of the pipe ducts and component tanks, the openings being dimensioned so as to allow the insertion of work tools into the component tanks, and radiation-shielding covers adjustable for closing the openings.

However, in sealing such openings, problems arise which can jeopardize the availability of the plant.

In accordance with a concomitant feature of the invention, the openings are cut into the surface of the ducts and/or tanks. The openings can be made only when required by means of cutting tools (including cutting torches). Thus, the openings can be adapted as to location and size to the respective repair or inspection purpose and are closed off again securely and completely by welding-in a cover member after the work is completed.

Through deposition of radioactive parts from the coolant, pipe lines and other components can radiate to such a degree even after the coolant is drained out, that work thereon is possible only by means of remotely controlled tools, and shielding may be dispensed with for a short time at most, for making an opening.

Other features which are considered as characteristic for the invention are set forth in the appended claims.

Although the invention is illustrated and described herein as embodied in a nuclear power installation with loop arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 3:
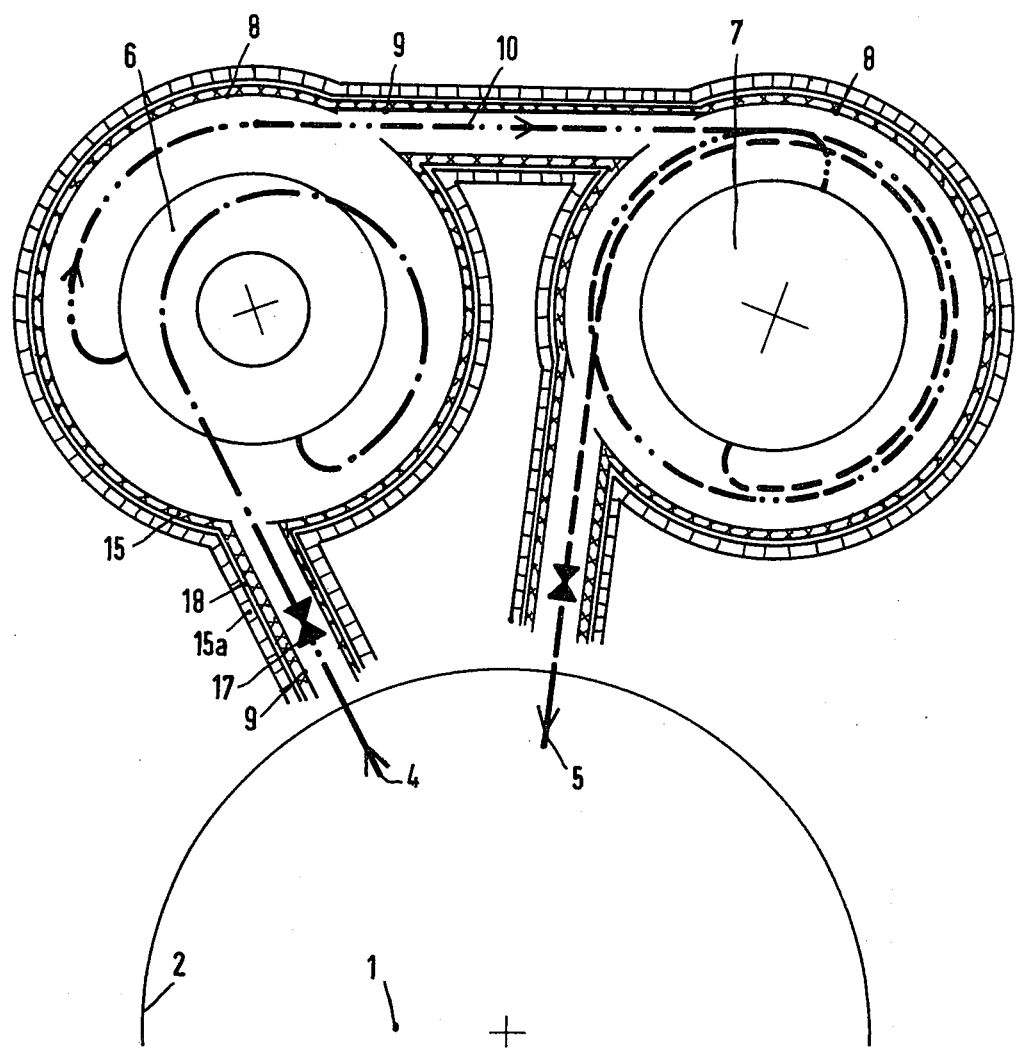
FIG. 3 is a view of an alternative embodiment of the invention, similar to the upper right-hand quadrant of FIG. 2.
Figure 4:
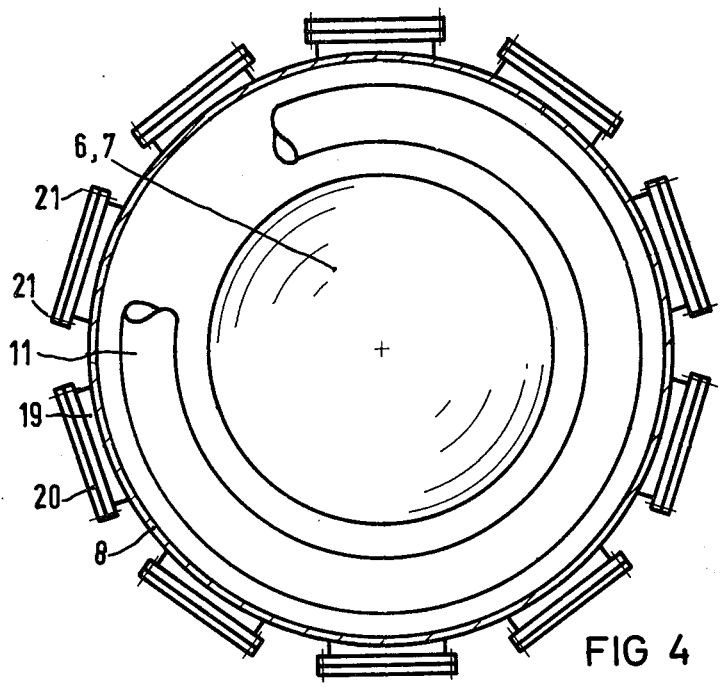
Figure 5:
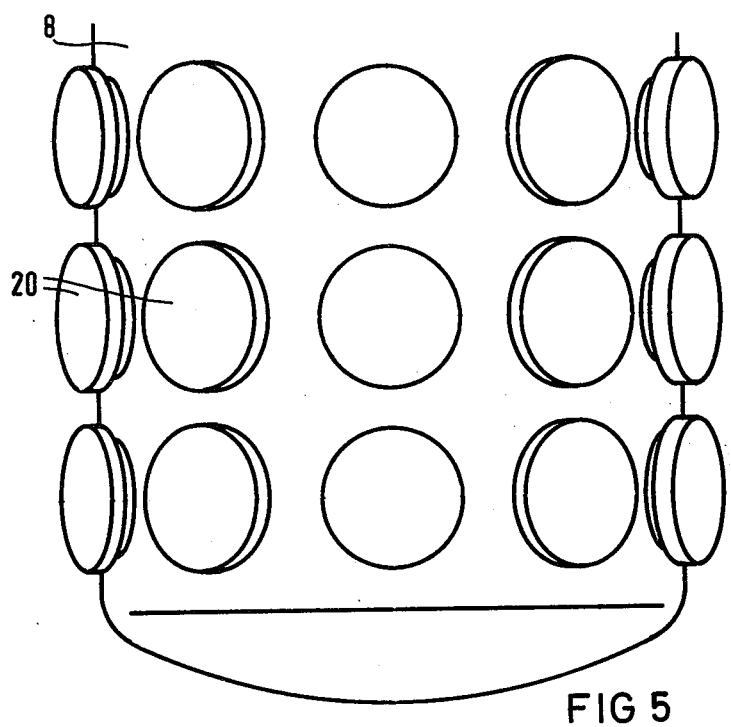
Figure 7:
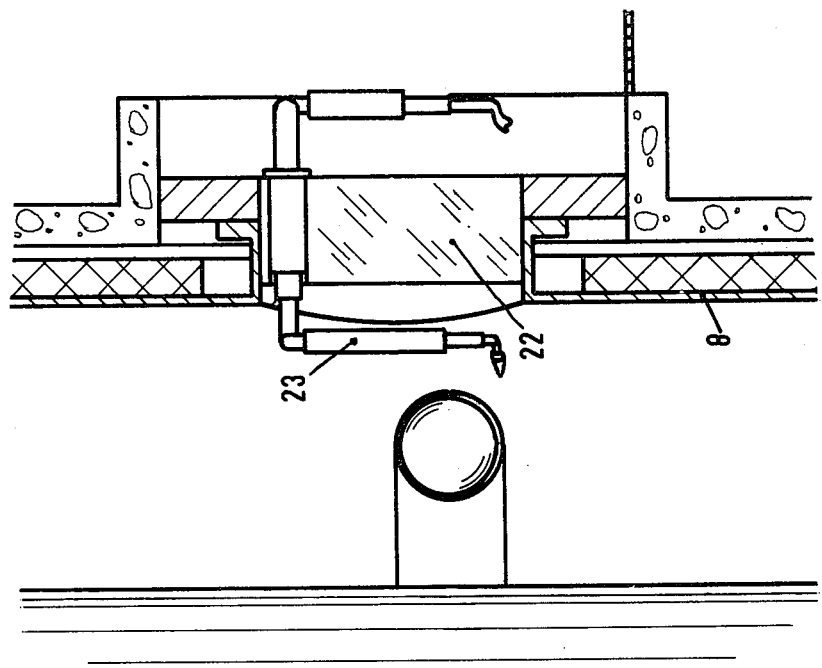
Figure 6:
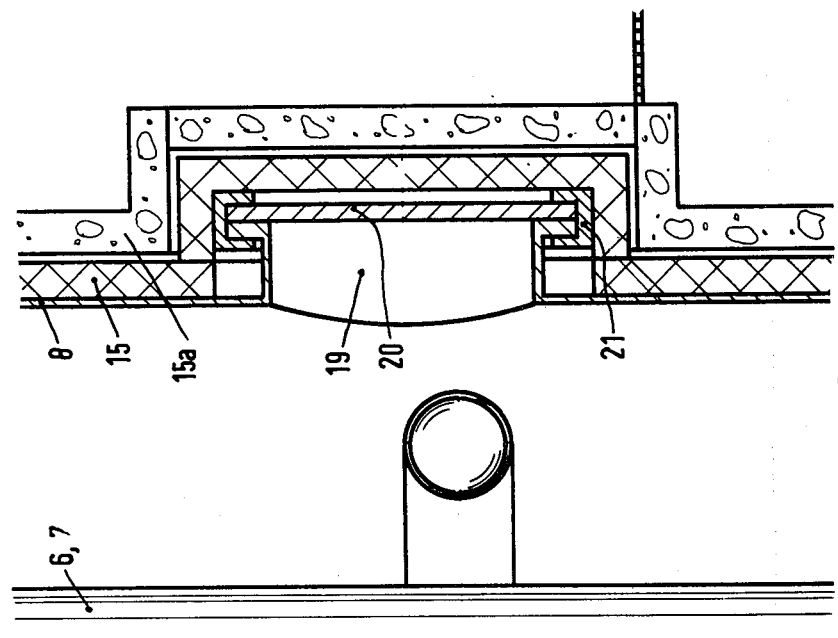

FIGS. 4 and 5 are a top plan view and side elevational view, respectively, of the component tank shown in FIG. 3, on an enlarged scale; and FIGS 6 and 7 are enlarged detailed views of the tank openings of FIGS. 4 and 5; FIG. 6 showing the condition during operation and FIG. 7, the condition during work on the radiating parts in a component tank.

Figure 1:
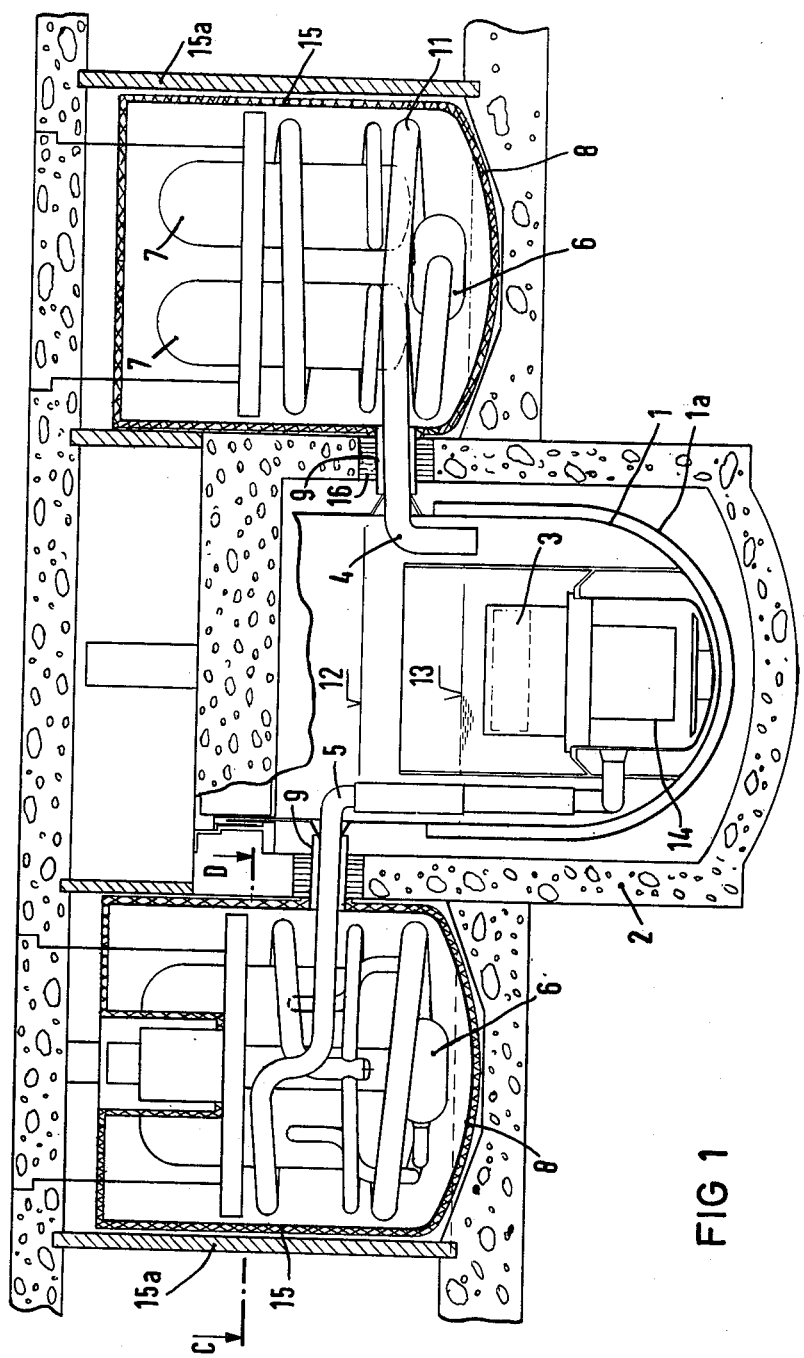
FIG. 1 is a diagrammatic longitudinal sectional view of a nuclear power plant with a sodium-cooled fast breeder reactor; the left half of the drawing corresponds to the view designated B and the right half to the view designated A in FIG. 2.
Figure 2:
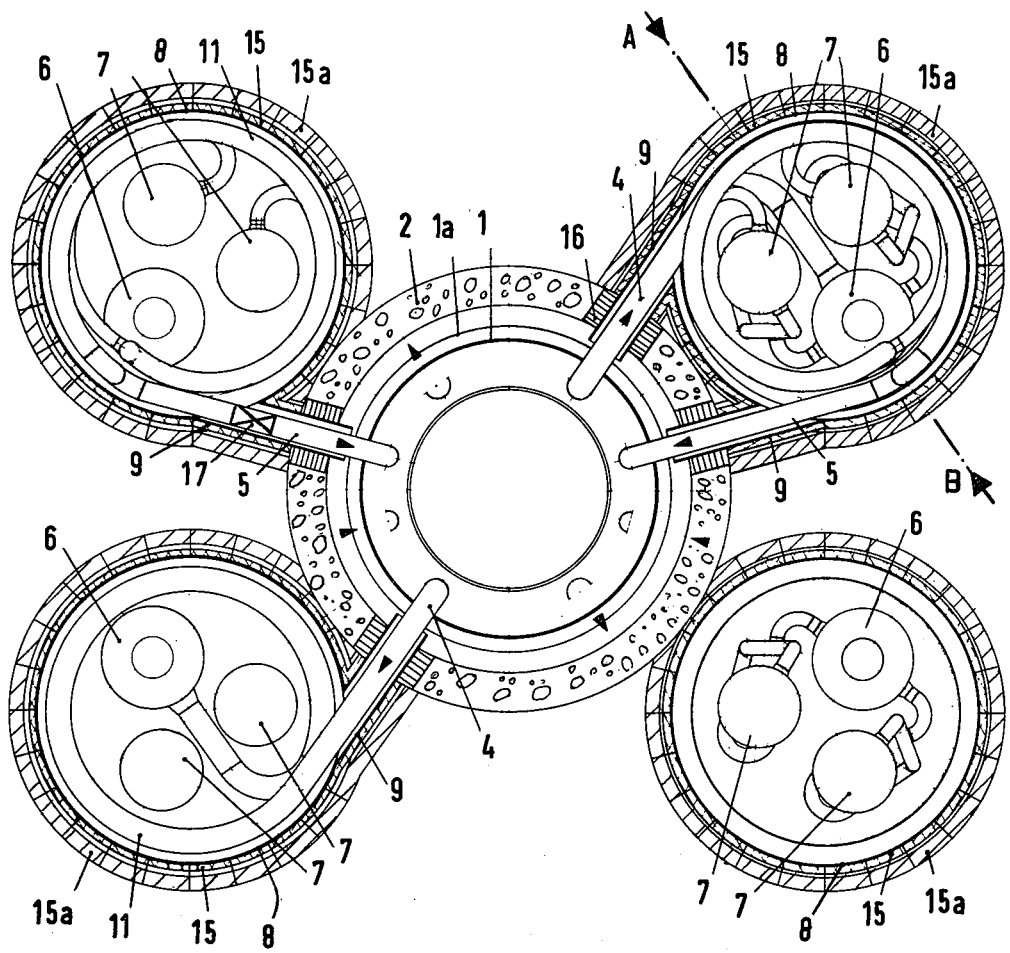
FIG. 2 is a cross sectional view of the same plant shown in FIG. 1; the upper right-hand quadrant of the figure is a cross sectional view taken along the line CD in FIG. 1 in the direction of the arrows; for the sake of clarity, the connections belonging to a certain component are shown in the other three quadrants, but do not correspond to a given section plane in FIG. 1.

Referring to the figures of the drawing and first, particularly to FIGS. 1 and 2 thereof, there is shown a reactor vessel 1, largely equipped with a double vessel 1a, disposed in a reactor cavity 2 which is made of concrete and serves simultaneously as a radiation shield. Inside the reactor vessel 1, is disposed a fission zone 3 with a breeder blanket, not shown separately, in which the coolant, sodium, for instance, is heated. The sodium fills the reactor vessel 1 up to an operating level 12, or at least up to an emergency level 13. Around the containment, four cooling loops are disposed in the example, which can be operated independently of each other, each of which being built up as follows: The hot coolant is drawn out of the reactor vessel 1 through a suction line 4 by means of a pump 6, and is pushed into at least one intermediate heat exchanger 7, where the primary coolant gives off its heat to a secondary coolant, which is also sodium in the example. From the intermediate heat exchanger 7, the cooled-off coolant returns through a pressure line 5 to the reactor vessel 1 and is conducted by guides 14 into the space under the fission zone 3. The distance between the reactor vessel 1 and the double vessel 1a is constructed so that if the coolant flows out of the vessel 1, the height of the sodium is kept at least at the emergency level 13, which ensures that proper cooling of the fission zone 3 is maintained.

The pumps 6 and the intermediate heat exchangers 7 are disposed in component tanks 8 which are grouped about the reactor cavity 2 and are connected thereto through pipe ducts 9. The component tanks 8 and the pipe ducts 9 are surrounded on the outside by thermal insulation 15 and shielding 15a, which are at least partially disassembleable. The pipe ducts 9 and the lines 4 and 5, which are installed in them, lead radially into the reactor vessel 1, but tangentially into the component tank 8. The radiation, which is generated in the fission zone 3 and propagates in a straight line, penetrates the wall of the reactor cavity 2 at the feedthroughs 16 for the pipes 4, 5. However, it does not strike the pump 6 or the intermediate heat exchanger 7, so that these parts are practically only activated by deposits of radioactive substances precipitated out of the coolant. This is helpful for their accessibility for repairs after the insulation 15 and the shielding 15a are removed and the component tank 8 has been opened. At the same time, this type of construction makes it possible to lead each of the suction line 4, and the pressure line 5, into the component tank 8 and to the respective component to be connected in a large expansion loop 11, whereby the changes in length of the pipe lines occurring due to different temperatures are compensated without setting up stresses which endanger their integrity. Inside the component tanks 8, the connecting lines 4, 5 are helically disposed and at least one of heat exchangers 7 and pumps 6 may be disposed within the helix. The reactor vessel 1, the reactor cavity 2 and the component tanks 8 can be secured rigidly, since the pipe ducts 9 are elastic, and can be for instance, in the form of corrugated-pipe compensators.

In the embodiment shown in FIGS. 1 and 2, a pump 6 and two intermediate heat exchangers 7 in each loop are accommodated in a common component tank 8. In FIG. 3, an alternative is shown such as may be of advantage for reactors of very large power output and corresponding dimensions of the individual components. In FIG. 3, one pump 6 and an intermediate heat exchanger 7 each are accommodated in a separate component tank 8. A pipe line 10 connecting them is conducted in an additional pipe duct 9. It is common to both embodiments that in the pipe lines 4, 5, valves and/or measuring instruments 17 can be disposed in the region of the pipe ducts 9 and therefore, in relatively easily accessible places. The component tanks and the pipe ducts 9 are moreover filled with a gas, for instance, nitrogen, which is inert vis-a-vis the coolant, in order to prevent reactions of the coolant with the atmosphere in the event of leaks. Nitrogen can also be blown as a cooling gas into a gap 18 between the insulation 15 of the component tank 8, or the pipe duct 9, and the shielding 15a, by means of known gas supply facilities, which are not shown here.

It can be seen from FIGS. 5-7 that by enlarging the component tank only slightly over the size required for accommodating the component, an expansion loop 11 which is sufficient for compensating the length changes of the pipe lines at different temperatures can be accommodated. For work on the pump 6 or the intermediate heat exchanger 7, access openings which are closed off by covers 20, are formed in the component tank 8. These covers can be fastened either in the manner of blind flanges by screw bolts or other screw connections 21 (FIGS. 4–6), or they may be welded into the openings 19. To perform work on the pump 6 or the intermediate heat exchanger 7, the flow in the loop in question is shut off from the reactor by means of valves 17 (FIG. 3), the coolant is drained off and one or more of the covers 20 are lifted. Into the opening 18 so exposed, a block 22 (see FIG. 7), of lead glass is inserted, so that the interior of the component tank 8 can be observed from the outside, the personnel being shielded from the radiation which may come from the corrosion products left behind in the pipes 4, 5, for instance. The necessary work inside the component tank 8 can be performed by one of the known manipulators 23, which is built into the glass block 22 and is removed together with the latter when the work is finished.

There are claimed:

1. Nuclear power installation with liquid metal cooling, comprising a reactor cavity, a primary circulatory loop carrying heat from the reactor cavity, a secondary coolant loop, intermediate heat exchanging means for transferring heat from the primary loop to the secondary loop and means for pumping coolant through the loops, said intermediate heat exchanging means and pumping means being disposed in separately insulated and heated component tanks, portions of the loops connected to said intermediate heat exchanging means and pumping means forming lines leading into the reactor cavity in radial direction thereof and into the component tank in tangential direction thereof, said connecting lines being helically disposed within the component tanks, and at least one of said intermediate heat exchanging means and said pumping means being disposed inside said helix.

2. Installation according to claim 1, wherein said intermediate heat exchanging means and pumping means associated with a primary loop are disposed in a common component tank.

3. Installation according to claim 1, wherein said intermediate heat exchanging means and pumping means associated with a primary loop are disposed in separate component tanks.

4. Installation according to claims 1, 2 or 3, including pipe ducts connected from the reactor cavity to the component tanks, said connecting lines being disposed so as to pass through said pipe ducts.

5. Installation according to claims 1, 2 or 3, including pipe ducts connected from the reactor cavity to the component tanks, said connecting lines being disposed so as to pass through said pipe ducts, inspection openings formed in at least one of said pipe ducts and component tanks, said openings being dimensioned so as to allow the insertion of work tools into the component tanks, and radiation-shielding covers adjustable for closing said opening.

6. Installation according to claim 5, wherein said openings are cut into the surface of said ducts and tanks.

* * * * *